United States Patent
Hisayama et al.

(10) Patent No.: US 11,073,325 B2
(45) Date of Patent: Jul. 27, 2021

(54) REFRIGERATION CYCLE APPARATUS

(71) Applicant: DAIKIN INDUSTRIES, LTD., Osaka (JP)

(72) Inventors: Kazushi Hisayama, Osaka (JP); Tetsuya Okamoto, Osaka (JP); Yoshinobu Tsumura, Osaka (JP); Kebi Chen, Osaka (JP); Masanori Ukibune, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/043,460

(22) PCT Filed: Mar. 25, 2019

(86) PCT No.: PCT/JP2019/012526
§ 371 (c)(1),
(2) Date: Sep. 29, 2020

(87) PCT Pub. No.: WO2019/188993
PCT Pub. Date: Oct. 3, 2019

(65) Prior Publication Data
US 2021/0025643 A1   Jan. 28, 2021

(30) Foreign Application Priority Data
Mar. 30, 2018 (JP) .............................. JP2018-070230

(51) Int. Cl.
*F25D 23/00* (2006.01)
*F25B 13/00* (2006.01)

(52) U.S. Cl.
CPC ............ *F25D 23/006* (2013.01); *F25B 13/00* (2013.01)

(58) Field of Classification Search
CPC ... F25D 23/006; F24F 1/12; F24F 1/40; F24F 1/0323; F24F 1/029; F25B 13/00; F25B 2500/13
See application file for complete search history.

(56) References Cited

U.S. PATENT DOCUMENTS

| 5,308,121 | A | 5/1994 | Heflin et al. |
| 5,839,295 | A | 11/1998 | Lehmann |
| 6,336,794 | B1 | 1/2002 | Kim |
| 2006/0117789 | A1* | 6/2006 | Yamasaki ............... F25D 19/00 62/448 |

FOREIGN PATENT DOCUMENTS

| JP | 63-199938 A | 8/1988 |
| JP | 5-10843 U | 2/1993 |

(Continued)

OTHER PUBLICATIONS

International Search Report, issued in PCT/JP2019/012526, PCT/ISA/210, dated May 14, 2019.

*Primary Examiner* — Edward F Landrum
*Assistant Examiner* — Melodee Jefferson
(74) *Attorney, Agent, or Firm* — Birch, Stewart, Kolasch & Birch, LLP.

(57) ABSTRACT

A refrigeration cycle apparatus has a compressor disposed via a bottom member of a housing, second elastic members, a base, and first elastic members. The compressor is disposed close to an arrangement centroid of the second elastic members.

6 Claims, 6 Drawing Sheets

(56) References Cited

FOREIGN PATENT DOCUMENTS

| | | | |
|---|---|---|---|
| JP | H0510843 B2 * | 2/1993 | ............ H03H 7/255 |
| JP | 9-166338 A | 6/1997 | |
| JP | 10-205454 A | 8/1998 | |
| JP | 3293865 B2 | 6/2002 | |
| JP | 2003-232543 A | 8/2003 | |
| JP | 2005-241197 A | 9/2005 | |
| JP | 2010-190163 A | 9/2010 | |
| JP | 2010-243033 A | 10/2010 | |
| JP | 2010243033 A * | 10/2010 | |
| JP | 2016-23900 A | 2/2016 | |

* cited by examiner

REFRIGERATION CYCLE APPARATUS

TECHNICAL FIELD

The present disclosure relates to a refrigeration apparatus including a double anti-vibration structure.

BACKGROUND ART

In some usage environments, a heat pump apparatus is required to have low-noise performance. To achieve low-noise performance, it is required to suppress vibration of a compressor constituting a refrigerant circuit of a heat pump from being transmitted to the entirety of the apparatus. For such a purpose, Patent Literature 1 (Japanese Unexamined Patent Application Publication No. 2005-241197) discloses a double anti-vibration structure. Patent Literature 1 describes disposing a support member in an apparatus body via a second anti-vibration member and mounting a compressor on the support member via a first anti-vibration member.

SUMMARY OF INVENTION

Technical Problem

Figure 1:
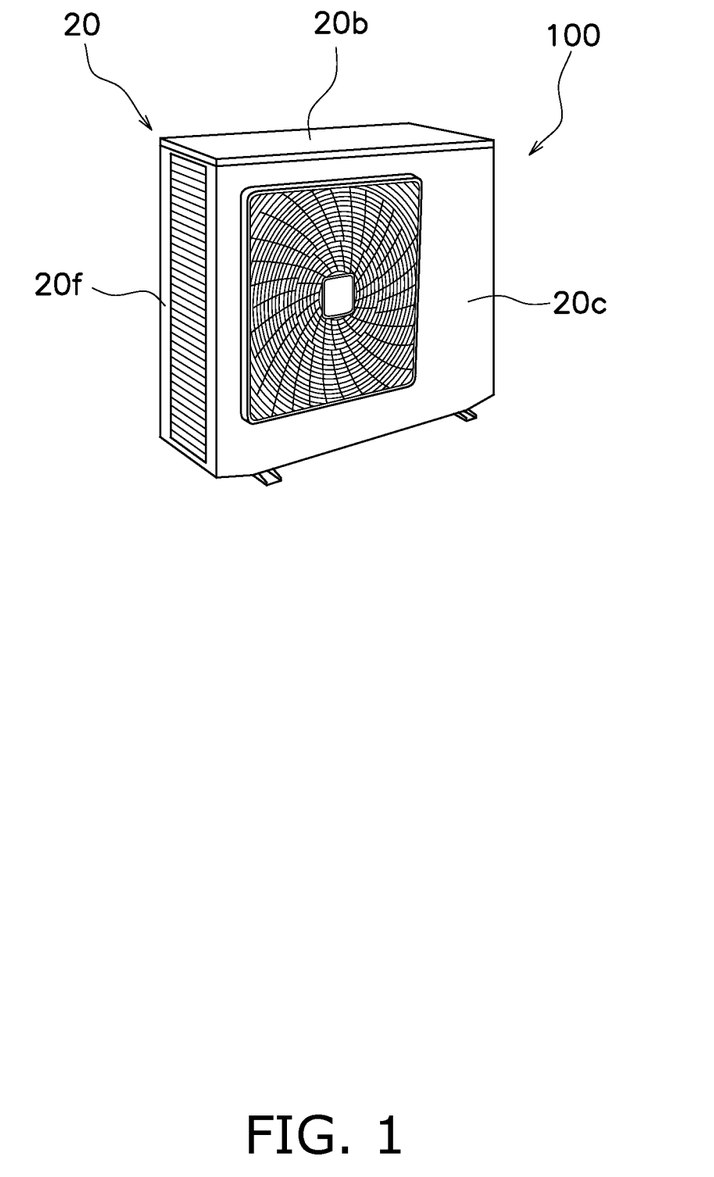
FIG. 1 is a perspective view of an appearance of a refrigeration cycle apparatus of a first embodiment.
Figure 4:
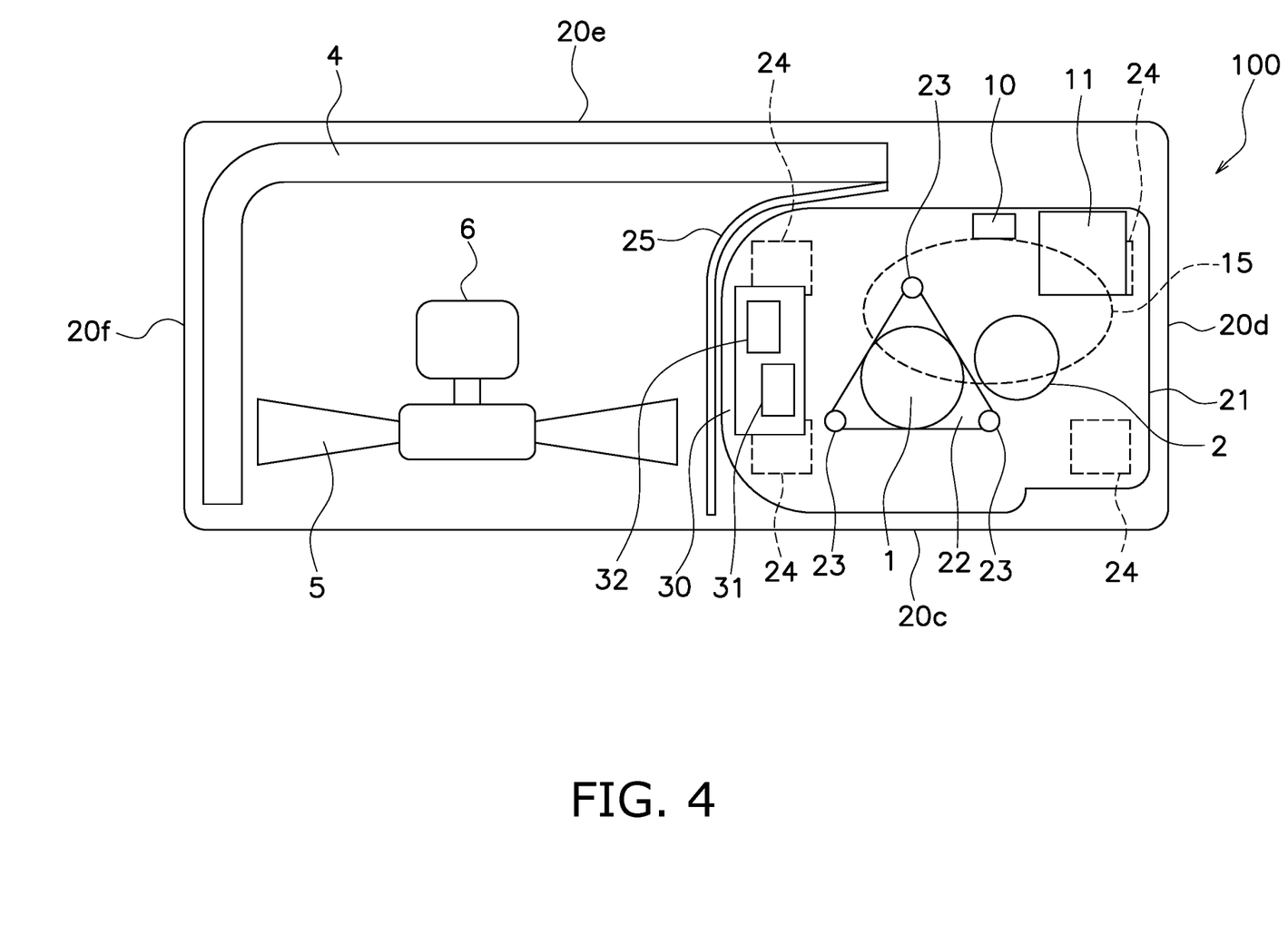
FIG. 4 is a top view of the refrigeration cycle apparatus of the first embodiment.

Referring to FIG. 1 and FIG. 4 of Patent Literature 1, the second anti-vibration member is disposed on each of four corners of the support member, and the compressor is disposed on an end of the support member. Thus disposing a compressor at a location away from the center of vibration of the support member has a problem that, for example, a large centrifugal force acts on the compressor when a base vibrates, and pipes are subjected to a large load.

Solution to Problem

A refrigeration cycle apparatus according to a first aspect includes a housing, second elastic members, a base, first elastic members, and a compressor. The housing includes a bottom member. The second elastic members are disposed on the bottom member. The base is disposed on the bottom member via the second elastic members. The first elastic members are disposed on the base. The compressor is configured to compress a refrigerant. The compressor is disposed on the base via the first elastic members. The apparatus further includes a least one of a group consisting of an economizer heat exchanger disposed on the base and a water heat exchanger disposed on the base. A projected position of a centroid of the compressor on the base is represented by a position P. A distance r1 is defined as a distance between the position P and a projected position on the base of a centroid of one of the first elastic members which is closest to the position P. On the base, a circle centered at the position P with a radius of 1.5 times r1 is drawn. The compressor and the second elastic members are disposed such that a projected position Q of an arrangement centroid of the second elastic members on the base is present inside the circle, excluding the case that the second elastic members are disposed to be symmetrical about the centroid of the compressor.

In the refrigeration cycle apparatus according to the first aspect, the compressor is disposed close to the arrangement centroid of the second elastic members, and thus, even when the base vibrates, a centrifugal force applied to the compressor is suppressed to be small, a shear force applied to the first elastic members is small, and a stress on a compressor connection pipe is small.

A refrigeration cycle apparatus according to a second aspect is the refrigeration cycle apparatus according to the first aspect in which the compressor and the second elastic members are disposed such that, when a circle centered at the position P with a radius of r1 is drawn on the base, the projected position Q of the arrangement centroid of the second elastic members on the base is present inside the circle.

In the refrigeration cycle apparatus according to the second aspect, the compressor is disposed closer to the arrangement centroid of the second elastic members, and thus, even when the base vibrates, the centrifugal force applied to the compressor is suppressed to be smaller, the shear force applied to the first elastic members is smaller, and the stress on the compressor connection pipe is smaller.

A refrigeration cycle apparatus according to a third aspect includes a housing, second elastic members, a base, first elastic members, and a compressor. The housing includes a bottom member. The second elastic members are disposed on the bottom member. The base is disposed on the bottom member via the second elastic members. The first elastic members are disposed on the base. The compressor is configured to compress a refrigerant. The compressor is disposed on the base via the first elastic members. The apparatus further includes at least one of a group consisting of an economizer heat exchanger disposed on the base and a water heat exchanger disposed on the base. A projected position of an arrangement centroid of the first elastic members on the base is represented by a position S. A distance r2 is defined as a distance between the position S and a projected position on the base of a centroid of one of the first elastic members which is closest to the position S. On the base, a circle centered at the position S with a radius of 1.5 times r2 is drawn. The first elastic members and the second elastic members are disposed such that a projected position Q of an arrangement centroid of the second elastic members on the base is present inside the circle, excluding the case that the second elastic members are disposed to be symmetrical about the centroid of the compressor.

In the refrigeration cycle apparatus according to the third aspect, the arrangement centroid of the first elastic members is disposed close to the arrangement centroid of the second elastic members in a top view, and thus, even when the base vibrates, a centrifugal force applied to the compressor is suppressed to be small, a shear force applied to the first elastic members is small, and a stress on a compressor connection pipe is reduced.

A refrigeration cycle apparatus according to a fourth aspect is the refrigeration cycle apparatus according to the third aspect in which the first elastic members and the second elastic members are disposed such that, when a circle centered at the position S with a radius of r2 is drawn on the base, the projected position Q of the arrangement centroid of the second elastic members on the base is present inside the circle.

In the refrigeration cycle apparatus according to the fourth aspect, the arrangement centroid of the first elastic members is disposed closer to the arrangement centroid of the second elastic members in a top view, and thus, even when the base vibrates, the centrifugal force applied to the compressor is suppressed to be smaller, the shear force applied to the first elastic members is smaller, and the stress on the compressor connection pipe is further reduced.

A refrigeration cycle apparatus according to a fifth aspect includes a housing, second elastic members, a base, first elastic members, and a compressor. The housing includes a bottom member. The second elastic members are disposed on the bottom member. The base is disposed on the bottom member via the second elastic members. The first elastic members are disposed on the base. The compressor is configured to compress a refrigerant. The compressor is disposed on the base via the first elastic members. The apparatus further includes at least one of a group consisting of an economizer heat exchanger disposed on the base and a water heat exchanger disposed on the base. On the base, a distance between a position Q of an arrangement centroid of the second elastic members and a position of a centroid of one of the second elastic members which is farthest from the position Q is represented by r3. On the base, a circle centered at the position Q with a radius of 0.2 times r3 is drawn. The compressor and the second elastic members are disposed such that a projected position P of a centroid of the compressor on the base is presented inside the circle, excluding the case that the second elastic members are disposed to be symmetrical about the centroid of the compressor.

In the refrigeration cycle apparatus according to the fifth aspect, the compressor is disposed close to the arrangement centroid of the second elastic members, and thus, even when the base vibrates, a centrifugal force applied to the compressor is suppressed to be small, a shear force applied to the first elastic members is small, and a stress on a compressor connection pipe is reduced.

A refrigeration cycle apparatus according to a sixth aspect includes a housing, second elastic members, a base, first elastic members, and a compressor. The housing includes a bottom member. The second elastic members are disposed on the bottom member. The base is disposed on the bottom member via the second elastic members. The first elastic members are disposed on the base. The compressor is configured to compress a refrigerant. The compressor is disposed on the base via the first elastic members. The apparatus further includes at least one of a group consisting of an economizer heat exchanger disposed on the base and a water heat exchanger disposed on the base. On the base, a distance between a position Q of an arrangement centroid of the second elastic members and a position of a centroid of one of the second elastic members which is farthest from the position Q is represented by r3. On the base, a circle centered at the position Q with a radius of 0.2 times r3 is drawn. The first elastic members and the second elastic members are disposed such that a projected position S of an arrangement centroid of the first elastic members on the base is present inside the circle, excluding the case that the second elastic members are disposed to be symmetrical about the centroid of the compressor.

In the refrigeration cycle apparatus according to the sixth aspect, the arrangement centroid of the first elastic members is disposed close to the arrangement centroid of the second elastic members in a top view, and thus, even when the base vibrates, a centrifugal force applied to the compressor is suppressed to be small, a shear force applied to the first elastic members is small, and a stress on a compressor connection pipe is reduced.

DESCRIPTION OF EMBODIMENTS

Figure 2:
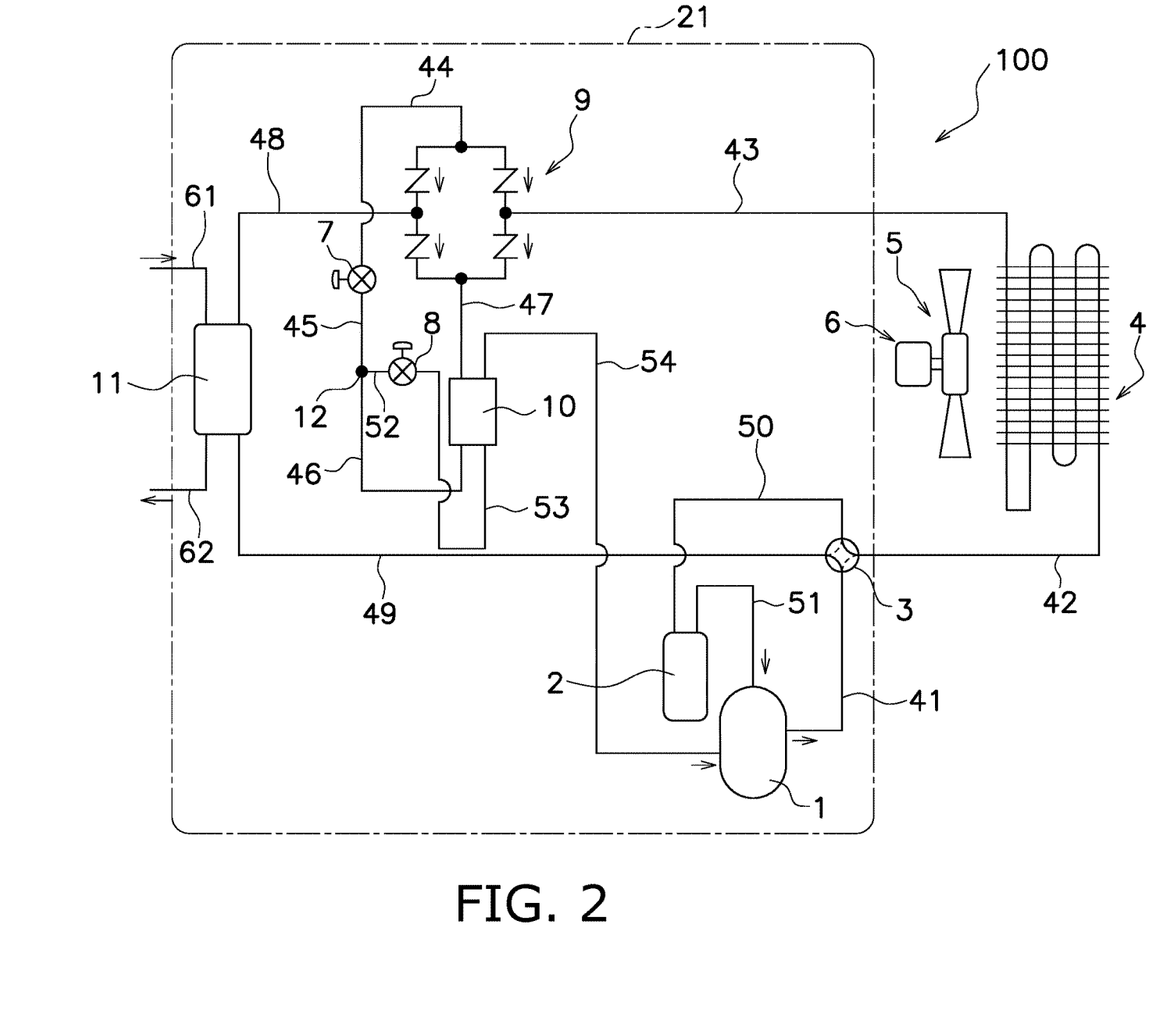
FIG. 2 is a diagram of a refrigerant circuit of the refrigeration cycle apparatus of the first embodiment.

First Embodiment (1) Configuration of Refrigerant Circuit of Refrigeration Cycle Apparatus A perspective view of an appearance of a refrigeration cycle apparatus 100 of a first embodiment and a refrigerant circuit are illustrated in FIG. 1 and FIG. 2, respectively. The refrigeration cycle apparatus 100 of the present embodiment is an apparatus that uses a heat pump and that heats and/or cools water. By using heated or cooled water, the refrigeration cycle apparatus 100 can be utilized as a water heater or a water cooler. Alternatively, by using heated or cooled water as a medium, the refrigeration cycle apparatus 100 may constitute an air conditioning apparatus that performs heating and cooling.

As illustrated in FIG. 2, the refrigerant circuit of the refrigeration cycle apparatus 100 of the present embodiment includes a compressor 1, an accumulator 2, a four-way switching valve 3, an air heat exchanger 4, a check valve 9, a first expansion valve 7, a second expansion valve 8, an economizer heat exchanger 10, and a water heat exchanger 11. With each device and a junction 12 connected to each other by pipes 41 to 54, a refrigerant circulates in each device, and a vapor compression refrigeration cycle is performed. The refrigeration cycle apparatus 100 further includes a fan 5 that sends air to the air heat exchanger 4, and a fan motor 6 that drives the fan.

When water is to be heated, the refrigeration cycle apparatus 100 operates as follows. The refrigerant is compressed by the compressor 1 and sent to the water heat exchanger 11, which acts as a condenser. The refrigerant is decompressed by, mainly, the first expansion valve 7, vaporized by the air heat exchanger 4, which acts as an evaporator, and sent to the compressor 1 again. Water enters the water heat exchanger 11 through a water entrance pipe 61, is heated by the refrigerant, and discharged through a water exit pipe 62. Heating and cooling of the water are performed by changing the flow of the refrigerant by switching of the four-way switching valve 3. When the water is to be cooled, the water heat exchanger 11 acts as a refrigerant evaporator.

(2) Arrangement of Devices in Refrigeration Cycle Apparatus

An arrangement of devices in the refrigeration cycle apparatus will be described by using the front view in FIG. 3 and the top view in FIG. 4. For ease of understanding, description of a refrigerant pipe, a control signal line, an electric power supply wire, and the like is omitted, as appropriate, in FIG. 3 and FIG. 4.

Figure 3:
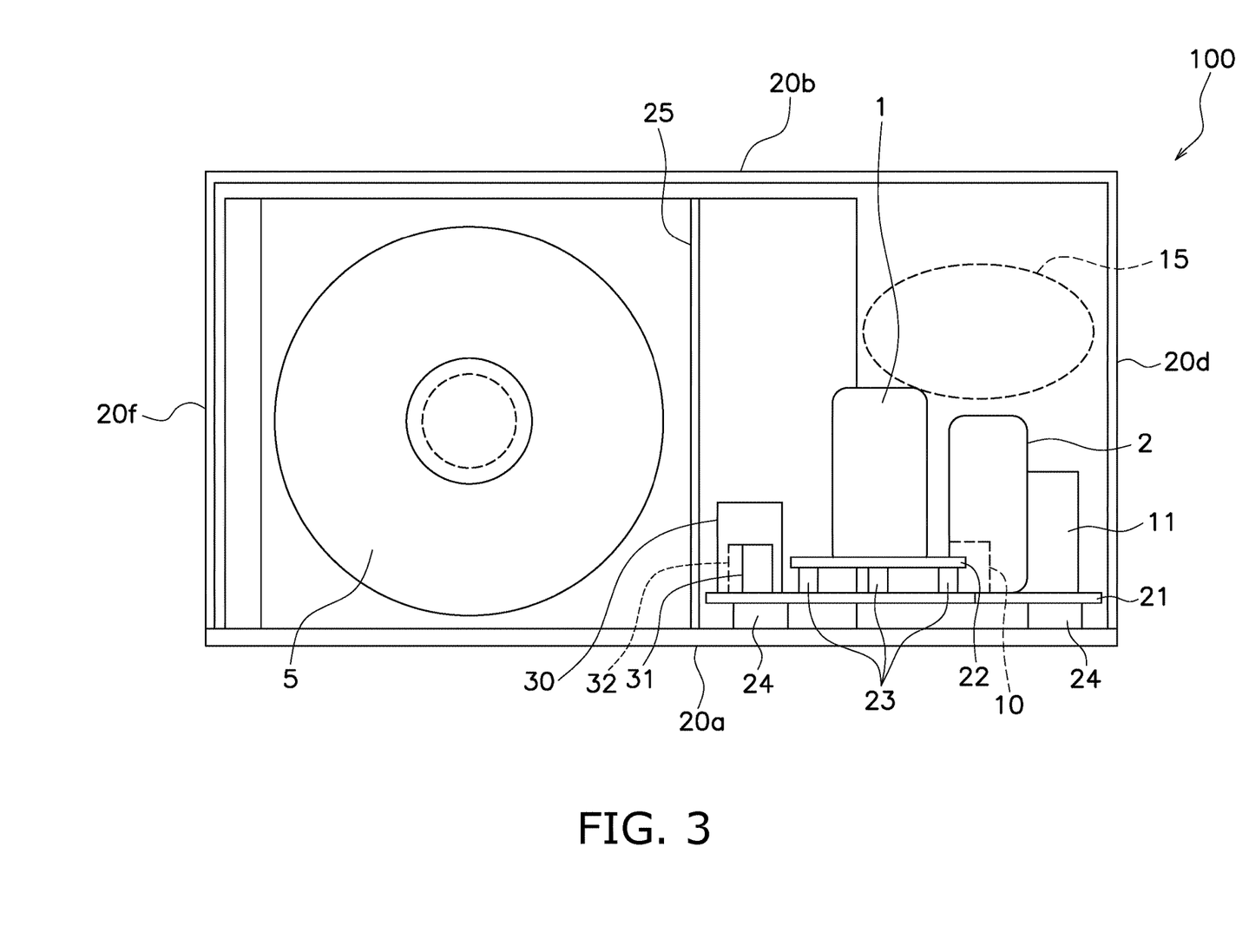
FIG. 3 is a schematic front view of the refrigeration cycle apparatus of the first embodiment.

As illustrated in FIGS. 1, 3, and 4, a housing 20 is constituted by a bottom member 20a, a top member 20b, a front member 20c, a right-side member 20d, a rear member 20e, and a left-side member 20f. The housing 20 covers the outer side of devices constituting the refrigeration cycle.

As illustrated in FIGS. 3 and 4, a space in an inner portion of the housing 20 is divided by a partition plate 25 into, roughly, a heat exchange chamber on the left side in which the air heat exchanger 4 and the fan 5 are disposed and a machine chamber on the right side in which devices, such as the compressor 1, are disposed.

As illustrated in FIG. 3, in the machine chamber, four second elastic members 24 are disposed on the bottom member 20a, and the base 21 is disposed on the second elastic members 24. The second elastic member 24 is disposed at each of the corners of the base 21 in FIG. 4 but may be constituted by one large piece or may be divided into two or more. A material of the second elastic members 24 is rubber or urethane.

The compressor 1 includes an elastic-member mount portion 22. First elastic members 23 are mounted on the elastic-member mount portion 22. The compressor 1 is supported on the base 21 by three first elastic members 23 and bolts (not illustrated). The first elastic members 23 are anti-vibration rubber.

The compressor 1 may be supported on the base 21 by the first elastic members and bolts or may be supported on the base 21 by only the first elastic members.

If being capable of supporting the compressor 1, the first elastic members 23 may be constituted by one piece or may be constituted by a plurality of first elastic members. A material of the first elastic members 23 may be, other than rubber, urethane. The material and the spring constant may be different or the same between the first elastic members 23 and the second elastic members 24.

In other words, the compressor 1 is disposed on a double anti-vibration structure via the first elastic members 23, the base 21, and the second elastic members 24. Consequently, even when the compressor 1 vibrates due to operation of the refrigeration cycle apparatus 100, transmission of the vibration and generation of noise are suppressed.

As illustrated in FIG. 3 and FIG. 4, a first electric component 31 and a second electric component 32 are housed and fixed in an electric-component casing 30. The electric-component casing 30 is fixed to the base 21. The first electric component 31 is a power device constituting an inverter that controls the compressor. The second electric component 32 controls the first expansion valve 7, the fan motor 6, the second expansion valve 8, and the four-way switching valve 3.

As illustrated in FIG. 3 and FIG. 4, in addition to the compressor 1 and the electric-component casing 30, the accumulator 2, the economizer heat exchanger 10, the water heat exchanger 11, and other refrigeration-cycle constituent components 15 are also disposed and fixed on the base 21. The frame of the base 21 in FIG. 2 indicates, of components constituting the refrigerant circuit, components disposed on the base 21. The other refrigeration-cycle constituent components 15 in FIG. 3 and FIG. 4 include the first expansion valve 7, the second expansion valve 8, the check valve 9, and the four-way switching valve 3. The refrigeration-cycle constituent components 15 are fixed to the base 21 by a pipe and other support members (not illustrated).

(3) Description of Arrangement of Compressor and Elastic Members in Anti-Vibration Structure (3-1) Description of Arrangement Centroid Before describing an arrangement position of the compressor 1 of the present embodiment, an arrangement centroid will be described.

The arrangement centroid is a point that serves as a center (node) of vibration of the base 21. In other words, the arrangement centroid is a point that does not move when the base vibrates. To be exact, it is thus required to perform measurement or calculation in a state in which a load is applied to the base 21, that is, in a state in which all of the devices are placed on the base 21. It is, however, required in a designing stage to determine a position of the compressor before placing those devices. Thus, in the present disclosure, the arrangement centroid of the second elastic members is defined as an arrangement centroid calculated as follows. The arrangement centroid of the second elastic members 24 is a position determined such that, when a position vector having a starting point at an arrangement centroid of the position of the centroid of each second elastic member 24 on the base 21 is multiplied by a spring reaction (scalar quantity) of each second elastic member 24 with respect to a unit load to thereby obtain vectors corresponding to the second elastic members 24, the total of the vectors is zero.

Figure 6:
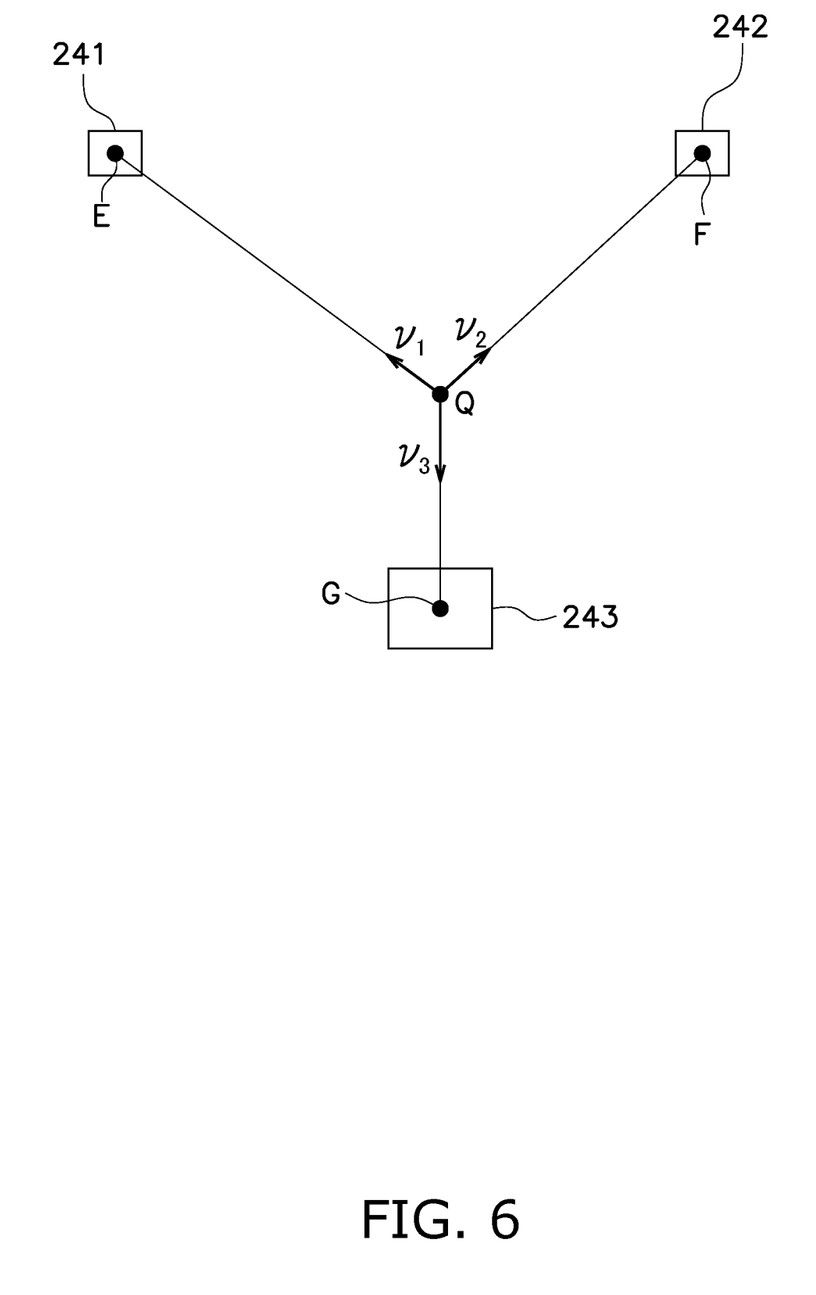
FIG. 6 describes a method of calculating an arrangement centroid.

Specifically, the arrangement centroid can be calculated as follows. Here, it is assumed, as an example, that three second elastic members 241, 242, and 243 are disposed as illustrated in FIG. 6, and the base 21 is disposed thereon. It is assumed that the upper surface of the base 21 is a flat surface. Tentatively, a position Q is determined on the base 21. Projected positions of the centroids of the second elastic members 241, 242, and 243 on the base 21 are represented by positions E, F, and G, respectively. First, a position vector of QE is obtained from the position Q, the position vector is multiplied by a spring reaction of the second elastic member 241, which is the first one, with respect to a unit load, and a vector v1 having the magnitude and the direction of QE is drawn.

Next, it is assumed that the second elastic member 242, which is the second one, has a spring constant, an area, and a thickness that are the same as those of the second elastic member 241, which is the first one. At this time, the magnitude of v2 is a length obtained by multiplying v1 by a distance ratio QF/QE. With the position Q as a base point, a vector v2 having a magnitude of v2 is drawn in the direction of QF. Next, it is assumed that the second elastic member 243, which is the third one, has a spring constant, an area, and a thickness that are different from those of the second elastic member 241, which is the first one. The magnitude of v3 becomes a length obtained through a multiplication of v1×(distance ratio QG/QE)×(area ratio)× (spring constant ratio)×(thickness ratio). With the position Q as a base point, a vector v3 having a magnitude of v3 is drawn in the direction of QG.

The vector total of the thus created vectors v1, v2, and v3 is calculated. When the vector total is zero or almost zero, the calculation is stopped, and the position Q is determined as an arrangement centroid. If zero is not obtained, the position Q is changed. Then, calculation is continued until the vector total becomes zero or almost zero, and a point where zero is obtained is determined as an arrangement centroid.

The arrangement centroid of the first elastic members is determined in the same manner. Note that, in either of the cases, the position of the arrangement centroid is determined at a position projected on the base 21 in a top view.

(3-2) Description of Arrangement Positions of Compressor, and First and Second Elastic Members in First Embodiment Next, in the first embodiment, an arrangement of the compressor 1 on the base 21 will be described.

Figure 5:
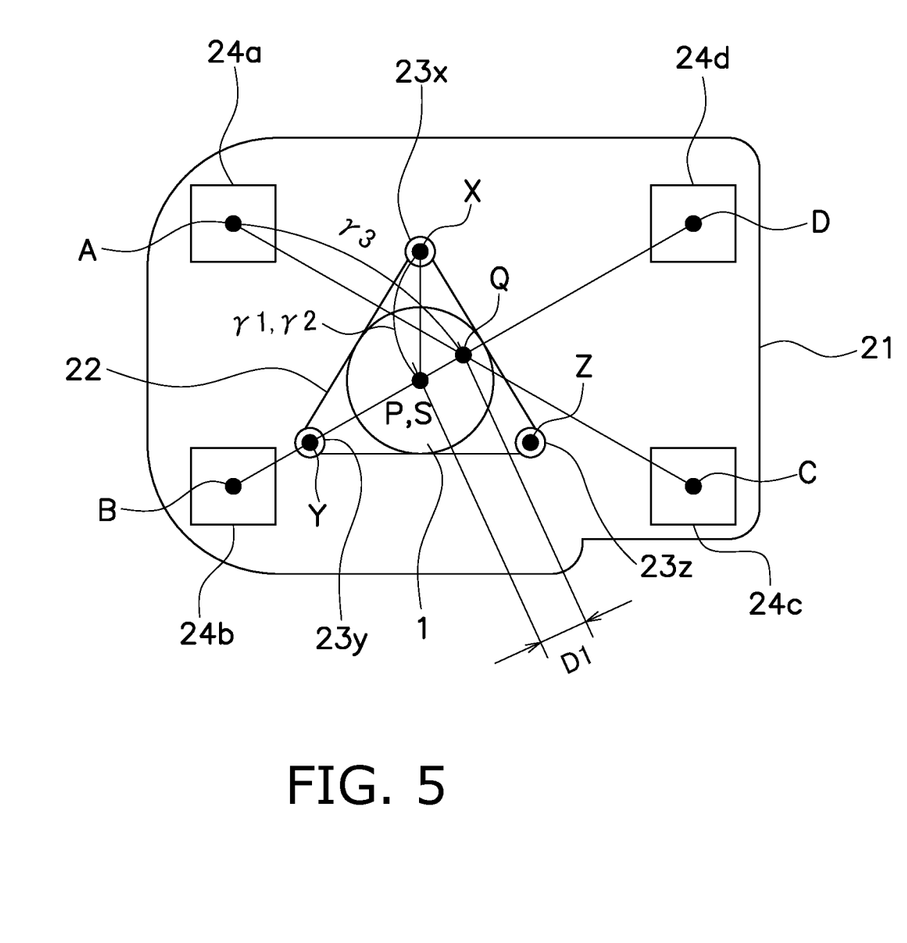
FIG. 5 is a plan of the arrangement of a compressor 1 on a base 21 of the first embodiment.

In FIG. 5, an arrangement of the compressor 1 (including the elastic-member mount portion 22), first elastic members 23x, 23y, and 23z, the base 21, and second elastic members 24a, 24b, 24c, and 24d in the present embodiment is illustrated. Positions A, B, C, and D indicate projected positions of centroids of the second elastic members 24a, 24b, 24c, and 24d, respectively, on the base 21 in top view. Positions X, Y, and Z indicate projected positions of centroids of the first elastic members 23x, 23y, and 23z, respectively, on the base 21 in top view.

In the first embodiment, the arrangement centroid of the second elastic members 24 is calculated. In the first embodiment, the second elastic members 24a, 24b, 24c, and 24d are constituted by the same material and have the same size and the same thickness. Therefore, the arrangement centroid of the second elastic members is the position Q, which is the intersection point of straight lines BD and AC.

The arrangement centroid of the first elastic members 23 also can be calculated as with the arrangement centroid of the second elastic members 24. In the first embodiment, as illustrated in FIG. 5, the projected positions X, Y, and Z of the centroids of the first elastic members 23x, 23y, and 23z on the base 21 in top view are the vertices of an equilateral triangle. The first elastic members 23x, 23y, and 23z are constituted by the same material and have the same area and the same thickness. A projected position S of the centroid of the total of the three first elastic members 23 on the base 21 is the position S of the centroid of an equilateral triangle XYZ.

Next, in the first embodiment, the compressor 1 has a cylindrical shape. The centroid of the compressor 1 can be approximated by the center of the circle in FIG. 5. Therefore, the projected position of the centroid of the compressor 1 on the base 21 is the position P. In other words, in the present embodiment, the projected position P of the centroid of the compressor 1 on the base 21 and the projected position S of the arrangement centroid of the first elastic members on the base 21 are coincident with each other.

In the present embodiment, a distance between the projected position P of the centroid of the compressor 1 on the base 21 and the projected position X of the centroid of the first elastic member 23x closest to the position P on the base 21 is PX=r1. In the present embodiment, regarding a distance between each of the other first elastic members 23y and 23z and the position P of the centroid of the compressor 1, PY=PZ=PX=r1 is also established.

Similarly, in the present embodiment, a distance between the projected position S of the arrangement centroid of the first elastic members 23 on the base 21 and the projected position X of the centroid of the first elastic member 23x closest to the position S on the base 21 is SX=r2=r1=PX. In the present embodiment, regarding a distance between each of the other first elastic members 23y and 23z and the position P of the centroid of the compressor 1, SY=SZ=SX=r2 is also established.

When, of distances between the positions A, B, C, and D, indicating the projected positions of the centroids of the second elastic members 24a, 24b, 24c, and 24d on the base 21, and the projected position Q of the arrangement centroid of the second elastic members on the base 21, a longest distance is represented by r3, AQ=r3. In the present embodiment, AQ=BQ=CQ=DQ=r3 is established.

It is assumed that PQ=D1 where PQ is a distance between the projected position P of the centroid of the compressor 1 on the base 21 and the projected position Q of the arrangement centroid of the second elastic members 24 on the base 21.

In the present embodiment, the compressor 1 is disposed close to the arrangement centroid of the second elastic members 24. Specifically, the compressor 1 and the second elastic members 24 are disposed such that, when a circle centered at the projected position P of the centroid of the compressor 1 on the base 21 with a radius of 1.5 times r1 is drawn on the base 21, the projected position Q of the arrangement centroid of the second elastic members 24 on the base 21 is present inside the circle. In the present embodiment, the position Q is present inside a circle centered at the position P with a radius of r1. Specifically, PQ=D1=r1×0.38 is satisfied.

From the other point of view, arrangements of the first elastic members 23 and the second elastic members 24 satisfy the following conditions. In top view, a distance SQ between the projected position Q of the arrangement centroid of the second elastic members 24 on the base 21 and the projected position S of the arrangement centroid of the first elastic members 23 on the base 21 is 1.5 times r2 or less. In the present embodiment, SQ is one time r2 or less. More specifically, SQ=D1=r2×0.38 is satisfied.

Arrangement positions of the compressor 1 and the second elastic members 24 can be defined as follows. When a circle centered at the position Q with a radius of 0.2 times r3 is drawn, the projected position P of the centroid of the compressor 1 on the base 21 is present inside the circle. In the first embodiment, PQ=D1=r3×0.19 is satisfied.

Arrangement positions of the first elastic members 23 and the second elastic members 24 can be defined as follows. When a circle centered at the position Q with a radius of 0.2 times r3 is drawn, the projected position S of the centroid of the first elastic members 23 on the base 21 is present inside the circle. In the first embodiment, SQ=D1=r3×0.19 is satisfied.

(4) Features 4-1

In the refrigeration cycle apparatus 100 of the present embodiment, the compressor 1 is disposed on the bottom member 20a via the first elastic members 23, the base 21, and the second elastic members 24. In other words, the double anti-vibration structure is employed to thereby address suppression of transmission of the vibration of the compressor 1 and calmness.

In the present embodiment, conditions are provided for the arrangement position of the compressor 1 on the base 21 in such a double anti-vibration structure. In other words, the compressor 1 is disposed close to the arrangement centroid of the second elastic members 24. More specifically, the compressor 1 and the second elastic members 24 are disposed such that, when a circle centered at the position P of the centroid of the compressor 1 with a radius of 1.5 times r1 is drawn on the base 21, the position Q of the arrangement centroid of the second elastic members 24 is present inside the circle. Here, r1 is a distance between the projected position P of the centroid of the compressor 1 on the base 21 and the projected position X on the base 21 of the centroid of one of the first elastic members 23 which is closest to the position P. A merit of such an arrangement will be described below in detail.

In the double anti-vibration structure, when the base 21 vibrates, the compressor 1 receives a larger centrifugal force as the compressor 1 becomes farther from the arrangement centroid of the base 21. When the centrifugal force increases, a shear force, which is a horizontal-direction component of the centrifugal force, increases. Generally, rigidity of the first elastic members 23 in the horizontal direction is small. Therefore, when the shear force is large, the first elastic members 23 are largely deformed. In particular, as a result of vibration displacement of the compressor increasing, a stress on a compressor connection pipe increases, and, in a worst case, a likelihood of the first elastic members being broken is generated. Moreover, since the compressor 1 becomes farther from the point that serves as the center (node) of vibration of the base 21 as the compressor 1 becomes farther from the arrangement centroid of the base 21, the vibration displacement of the compressor resulting from vibration displacement of the base 21 also increases, which increases the stress on the compressor connection pipe. During transportation, in particular, there is a likelihood of the base 21 being largely shaken laterally. Thus, when vibration is large, as a measure for such a circumstance, an exclusive fixing member or specification design of special spring rigidity in the horizontal direction for the first elastic members 23 may be required.

In contrast, in the configuration of the first embodiment, since the compressor 1 is disposed close to the arrangement centroid of the base 21, the centrifugal force decreases. The shear force in the horizontal direction on the first elastic members also decreases, and the stress on the compressor connection pipe can be also reduced. Further, vibration displacement of the compressor 1 with respect to the housing 20 can be also reduced, and thus, it is also possible to reduce the load on the compressor connection pipe. A special measure for vibration during transportation is also not required.

When the compressor 1 is separated from the arrangement centroid of the base 21, the centrifugal force increases, as described above, a moment to overturn the compressor also increases, and there is a likelihood of an excessive load being applied also to the first elastic members 23. In contrast to this, in the present embodiment, due to the compressor 1 being disposed close to the arrangement centroid of the second elastic members 24, the moment to overturn the compressor can be reduced, and it is possible to prevent the first elastic members 23 from being broken.

On the bottom member 20a, recesses and projections may be provided for rigidity improvement. Although the second elastic members 24 are disposed on the bottom member 20a, it is often impossible for the second elastic members 24, due to these recesses and projections, to freely select the arrangement place. Thus, as with the present embodiment, when providing a reference in which the projected position Q of the arrangement centroid of the second elastic members 24 on the base 21 is present inside a circle centered at the position P with a radius of r1×1.5, it is possible to determine the arrangement of the second elastic members 24 relatively easily.

4-2

More preferably, in the refrigeration cycle apparatus 100 of the present embodiment, the compressor 1 and the second elastic members 24 are disposed as follows. That is, the projected position Q of the arrangement centroid of the second elastic members 24 on the base 21 is present inside a circle centered at the projected position P of the centroid of the compressor 1 on the base 21 with a radius of r1.

As a result of this arrangement, the centrifugal force on the compressor 1 is further reduced, the shear force in the horizontal direction on the first elastic members 23 is also further reduced, and the stress on the compressor connection pipe can be also further reduced. Further, vibration displacement of the compressor 1 with respect to the housing 20 can be also further reduced, and thus, it is also possible to further reduce the load on the compressor connection pipe.

Consequently, the first elastic members 23 are disposed with respect to the arrangement centroid of the second elastic members 24 so as to cancel the overturning moment by surrounding the arrangement centroid, which stabilizes the behavior of the compressor 1 with respect to the vibration of the base 21.

4-3

In another aspect of the refrigeration cycle apparatus 100 of the present embodiment, the first elastic members 23 and the second elastic members 24 are disposed so as to satisfy the following conditions. On the base 21, a circle centered at the projected position S of the arrangement centroid of the first elastic members on the base with a radius of 1.5 times r2 is drawn. Here, r2 is a distance between the position S and the projected position on the base of the centroid of one of the first elastic members which is closest to the position S. The projected position Q of the arrangement centroid of the second elastic members on the base 21 is determined so as to be present inside the circle.

By thus disposing the first elastic members 23 and the second elastic members 24, it is possible, similarly to that in (4-1), to reduce the centrifugal force applied to the compressor 1, reduce also the shear force in the horizontal direction on the first elastic members 23, and reduce the stress on the compressor connection pipe.

4-4

More preferably, in the refrigeration cycle apparatus 100 of the present embodiment, the first elastic members 23 and the second elastic members 24 are disposed as follows. That is, the projected position Q of the arrangement centroid of the second elastic members 24 on the base 21 is present in a circle centered at the projected position S of the arrangement centroid of the first elastic members on the base 21 with a radius of r2.

As a result of this arrangement, the centrifugal force on the compressor 1 is further reduced, the shear force in the horizontal direction on the first elastic members 23 is also further reduced, and the stress on the compressor connection pipe can be also further reduced. Further, vibration displacement of the compressor 1 with respect to the housing 20 can be also further reduced, and thus, it is also possible to further reduce the load on the compressor connection pipe.

Consequently, the first elastic members 23 are disposed with respect to the arrangement centroid of the second elastic members 24 so as to cancel the overturning moment by surrounding the arrangement centroid, which stabilizes the behavior of the compressor 1 with respect to the vibration of the base 21.

4-5

In another aspect of the refrigeration cycle apparatus 100 of the present embodiment, the compressor 1 and the second elastic members 24 are disposed so as to satisfy the following conditions. On the base 21, a circle centered at the projected position Q of the arrangement centroid of the second elastic members 24 on the base with a radius of 0.2 times r3 is drawn. The projected position P of the centroid of the compressor 1 on the base 21 is determined to be present inside the circle.

By thus disposing the compressor 1 and the second elastic members 24, it is possible, similarly to that in (4-1), to reduce the centrifugal force applied to the compressor 1, reduce the shear force applied to the first elastic members 23, and reduce the stress on the compressor connection pipe.

4-6

In another aspect of the refrigeration cycle apparatus 100 of the present embodiment, the first elastic members 23 and the second elastic members 24 are disposed so as to satisfy the following conditions. On the base 21, a circle centered at the projected position Q of the arrangement centroid of the second elastic members on the base with a radius of 0.2 times r3 is drawn. The projected position S of the arrangement centroid of the first elastic members 23 on the base 21 is determined to be present inside the circle.

By thus disposing the first elastic members 23 and the second elastic members 24, it is possible, similarly to that in (4-1), to reduce the centrifugal force applied to the compressor 1, reduce the shear force applied to the first elastic members 23, and reduce the stress on the compressor connection pipe.

Although embodiments of the present disclosure have been described above, it should be understood that various changes in forms and details are possible without deviating from the gist and the scope of the present disclosure described in the claims.

REFERENCE SIGNS LIST 1 compressor
2 accumulator
3 four-way switching valve
4 air heat exchanger
5 fan
6 motor
7 first expansion valve
8 second expansion valve
9 check valve
10 economizer heat exchanger
11 water heat exchanger
20 housing
20a bottom member
21 base
23 first elastic member
24 second elastic member
30 electric-component casing
100 refrigeration cycle apparatus

CITATION LIST

Patent Literature

PTL 1: Japanese Unexamined Patent Application Publication No. 2005-241197

The invention claimed is:

1. A refrigeration cycle apparatus comprising:
a housing including a bottom member;
a second plurality of elastic members disposed on the bottom member;
a base disposed on the bottom member via the second plurality of elastic members;
a first plurality of elastic members disposed on the base;
a compressor disposed on the base via the first plurality of elastic members and configured to compress a refrigerant; and
at least one of a group consisting of an economizer heat exchanger disposed on the base and a water heat exchanger disposed on the base,
wherein, when a distance between a projected position P of a centroid of the compressor on the base and a projected position on the base of a centroid of one of the first plurality of elastic members which is closest to the position P is represented by r1,
the compressor and the second plurality of elastic members are disposed such that, when a circle centered at the position P with a radius of 1.5 times r1 is drawn on the base, a projected position Q of an arrangement centroid of the second plurality of elastic members on the base is present inside the circle, excluding the case that the second plurality of elastic members are disposed to be symmetrical about the centroid of the compressor.

2. The refrigeration cycle apparatus according to claim 1, wherein the compressor and the second plurality of elastic members are disposed such that, when a circle centered at the position P with a radius of r1 is drawn on the base, the projected position Q of the arrangement centroid of the second plurality of elastic members on the base is present inside the circle.

3. A refrigeration cycle apparatus comprising:
a housing including a bottom member;
a second plurality of elastic members disposed on the bottom member;
a base disposed on the bottom member via the second elastic members;
a first plurality of elastic members disposed on the base;
a compressor disposed on the base via the first plurality of elastic members and configured to compress a refrigerant; and
at least one of a group consisting of an economizer heat exchanger disposed on the base and a water heat exchanger disposed on the base,
wherein the first plurality of elastic members has an arrangement centroid different from an arrangement centroid of the second plurality of elastic members, and
wherein, when a distance between a projected position S of an arrangement centroid of the first plurality of elastic members on the base and a projected position on the base of a centroid of one of the first plurality of elastic members which is closest to the position S is represented by r2,
the first plurality of elastic members and the plurality of second elastic members are disposed such that, when a circle centered at the position S with a radius of 1.5 times r2 is drawn on the base, a projected position Q of an arrangement centroid of the second plurality of elastic members on the base is present inside the circle, excluding the case that the second plurality of elastic members are disposed to be symmetrical about the centroid of the compressor.

4. The refrigeration cycle apparatus according to claim 3, wherein the first plurality of elastic members and the second plurality of elastic members are disposed such that, when a circle centered at the position S with a radius of r2 is drawn on the base, the projected position Q of the arrangement centroid of the second plurality of elastic members on the base is present inside the circle.

5. A refrigeration cycle apparatus comprising:
a housing including a bottom member;

a second plurality of elastic members disposed on the bottom member;
a base disposed on the bottom member via the second plurality of elastic member;
a first plurality of elastic members disposed on the base;
a compressor disposed on the base via the first plurality of elastic members and configured to compress a refrigerant; and
at least one of a group consisting of an economizer heat exchanger disposed on the base and a water heat exchanger disposed on the base,
wherein, when a distance between a projected position Q of an arrangement centroid of the second plurality of elastic members on the base and a projected position on the base of a centroid of one of the second plurality of elastic members which is farthest from the position Q is represented by r3,
the compressor and the second plurality of elastic members are disposed such that, when a circle centered at the position Q with a radius of 0.2 times r3 is drawn on the base, a projected position P of a centroid of the compressor on the base is present inside the circle, excluding the case that the second plurality of elastic members are disposed to be symmetrical about the centroid of the compressor.

6. A refrigeration cycle apparatus comprising:
a housing including a bottom member;
a second plurality of elastic members disposed on the bottom member;
a base disposed on the bottom member via the second plurality of elastic members;
a first elastic plurality of members disposed on the base;
a compressor disposed on the base via the first plurality of elastic members and configured to compress a refrigerant; and
at least one of a group consisting of an economizer heat exchanger disposed on the base and a water heat exchanger disposed on the base,
wherein, when a distance between a projected position Q of an arrangement centroid of the second plurality of elastic members on the base and a projected position on the base of a centroid of one of the second plurality of elastic members which is farthest from the position Q is represented by r3,
the first plurality of elastic members and the plurality of second elastic members are disposed such that, when a circle centered at the position Q with a radius of 0.2 times r3 is drawn on the base, a projected position S of an arrangement centroid of the first plurality of elastic members on the base is present inside the circle, excluding the case that the second plurality of elastic members are disposed to be symmetrical about the centroid of the compressor.

* * * * *